United States Patent [19]

Higham et al.

[11] Patent Number: 4,924,675
[45] Date of Patent: May 15, 1990

[54] LINEAR MOTOR COMPRESSER WITH STATIONARY PISTON

[75] Inventors: Graham J. Higham, Ashland; Gerald R. Pruitt, Mendon; Ronald Morris, Acton, all of Mass.; Frank Heger, Burnt Hills, N.Y.; James Livingstone, Framingham; David Tormey, Dorchester, both of Mass.

[73] Assignee: Helix Technology Corporation, Waltham, Mass.

[21] Appl. No.: 371,510

[22] Filed: Jun. 26, 1989

Related U.S. Application Data

[63] Continuation of Ser. No. 106,549, Oct. 8, 1987, abandoned.

[51] Int. Cl.$^5$ ............................................. F25B 9/00
[52] U.S. Cl. ........................................ 62/6; 60/520; 310/15; 417/417
[58] Field of Search .................. 62/6; 60/520; 310/15, 310/16; 417/417

[56] References Cited

U.S. PATENT DOCUMENTS

| | | | |
|---|---|---|---|
| 2,198,506 | 4/1940 | Replogle | 417/338 |
| 2,832,919 | 4/1958 | Reutter et al. | 317/188 |
| 3,274,795 | 9/1966 | Fowle et al. | 62/403 |
| 3,484,629 | 12/1969 | Kunz | 310/15 |
| 4,363,980 | 12/1982 | Petersen | 310/15 |
| 4,389,849 | 6/1983 | Beggs | 62/6 |
| 4,507,579 | 3/1985 | Turner | 310/23 |
| 4,545,209 | 10/1985 | Young | 62/6 |
| 4,578,956 | 4/1986 | Young | 62/6 |
| 4,610,143 | 9/1986 | Stolfi et al. | 62/6 |
| 4,642,547 | 2/1987 | Redlich | 310/15 |
| 4,644,851 | 2/1987 | Young | 92/127 |
| 4,675,563 | 6/1987 | Goldowsky | 310/15 |
| 4,697,113 | 9/1987 | Young | 62/6 |
| 4,783,968 | 11/1988 | Higham et al. | 62/6 |

FOREIGN PATENT DOCUMENTS

| | | |
|---|---|---|
| 0028144 | 10/1980 | European Pat. Off. |
| 0046585 | 8/1981 | European Pat. Off. |
| 0076726 | 9/1982 | European Pat. Off. |

OTHER PUBLICATIONS

Technical Report; Rotary-Reciprocating Cryogenic Refrigeration System Studies Part 1 Analysis; Arthur D. Little, Inc.; 1971.

*Primary Examiner*—Ronald C. Capossela
*Attorney, Agent, or Firm*—Hamilton, Brook, Smith & Reynolds

[57] ABSTRACT

A linear motor compressor within a cryogenic refrigerator wherein the compressor space, within which a gaseous fluid is alternately compressed and expanded, is formed by a stationary piston and a reciprocating armature that is concentric about the piston. The armature is supported along a clearance seal the stationary piston. An axial bore along the stationary piston conveys gaseous fluid from the compression space to a displacer within the cold finger of the cryogenic refrigerator. An isolator for reducing transimission into and out of the compressor comprising a dynamic absorber and flat springs mounted with a damping material between the compressor and a mounting frame. A sensor for detecting the position of the armature utilizes a target magnet whose magnetic flux lines are decoupled from the flux lines generated about the coil.

27 Claims, 2 Drawing Sheets

LINEAR MOTOR COMPRESSER WITH STATIONARY PISTON

This application is a continuation of application Ser. No. 07/106,549, filed Oct. 8, 1987, now abandoned.

RELATED U.S. APPLICATIONS

"Linear Drive Motor with Flexure Bearing Support" filed on Oct. 8, 1987, by Graham Higham and corresponding to U.S. Pat. No. 4,798,054; and "Linear Drive Motor With Improved Dynamic Absorber" filed on Oct. 8, 1987, by Graham Higham and corresponding to U.S. Pat. No. 4,819,439.

BACKGROUND OF THE INVENTION

This invention relates to cryogenic refrigerators such as split Stirling cryogenic refrigerators. In particular, it relates to small refrigeration systems having compressors driven by linear motors.

Conventional split Stirling refrigerators usually include a reciprocating compressor and a displacer in a cold finger removed from the compressor. The piston of the compressor is mechanically driven to provide a nearly sinusoidal pressure variation in a pressurized refrigeration gas. The refrigeration gas is usually helium. This pressure variation is transmitted through a supply line to the displacer in the cold finger.

Typically, an electric motor drives the compressor through a crankshaft which is rotatably secured to the compressor. The compressing movement of the compressor causes pressure in the working volume to rise from a minimum pressure to a maximum pressure and, thus, warm the working volume of gas. Heat from the warmed gas is transferred to the environment so that the compression at the warm end of the cold finger is near isothermal. The high pressure creates a pressure differential across the displacer in the cold finger which, when retarding forces are overcome, is free to move within the cold finger. With the movement of the displacer, high pressure working gas at about ambient pressure is forced through a regenerator and into a cold space. The regenerator absorbs heat from the flowing pressurized refrigerant gas and thus reduces the temperature of the gas.

As the compressor piston reverses direction and begins to expand the volume of gas in the working space, the high pressure helium in the displacer is cooled even further. It is this cooling in the cold end of the displacer which provides refrigeration for maintaining a time average temperature gradient of over 200° Kelvin over the length of the regenerator.

At some point the decrease in pressure caused by expanding movement of the piston drops sufficiently to overcome retarding forces on the displacer to be returned to its starting position. Cold gas from the cold end of the cold finger is driven once again through the regenerator and extracts heat therefrom.

Recently, refrigerators have been proposed and manufactured that depend on linear motors to control the movement of the piston or pistons in the compressor, and to control movement of the displacer. The systems use clearance seals between hard ceramic and/or cermet pistons and cylinder liners. An example is disclosed in U.S. Pat. No. 4,545,209 filed by Niels Young on Jan. 17, 1983. Isolation systems using dynamic absorbers have been used in conjunction with such linear drive systems. Such a system is described in the U.S. Pat. No. 4,783,968.

A goal of such linear refrigerators is long life and reduced wear as must be provided for advanced aircraft and spacecraft.

DISCLOSURE OF THE INVENTION

The invention comprises several improvements in linear drive motors used in compressors of cryogenic refrigerators. A stationary piston is used to form a compression space which is alternately compressed and expanded by an axially reciprocating armature supported by the stationary piston. A clearance seal between the armature and stationary piston forms a seal between an armature volume, wherein the armature reciprocates, and the compression space. The stationary piston forms a stiff support for the armature such that the center of gravity of the armature lies within the piston volume through the full stroke. This minimizes uneven radial loading of the clearance seal by the armature, thereby keeping wear to a minimum. The stationary piston of one embodiment is comprised of heat conductive aluminum used to cool the drive assembly. The compression space communicates with the remainder of the working volume of the refrigerator via a conduit. The conduit consists of a bore along the center of the stationary piston connected with a gas fitting assembly which delivers gas to a cold finger of a cryogenic refrigerator.

A member extends from one end of the armature to support a magnet that is physically isolated from the coil assembly used to drive the armature. The isolated magnet is used in conjunction with a sensor to determine the position of the armature with respect to the housing containing the linear drive unit. By isolating this target magnet from the coil assembly the magnetic flux lines generated by the stator of the drive unit area decoupled from the magnetic flux lines about the target magnet. This results in a substantial improvement in drive efficiency while retaining accurate monitoring of armature position.

A further improvement in drive performance is obtained by shielding the coil assembly. A cylindrically shaped material is placed concentric about the coil assembly which operates to confine the magnetic flux lines generated by the coil within the outer linear drive housing. This prevents magnetic noise from interfering with external systems adjacent to the linear drive and further improves decoupling of the coil assembly from the target magnet.

A counterbalance mass is attached to the compressor which is tuned to set up an antiphase movement with respect to the reciprocating armature. The counterbalance mass thus operates to counter the force exerted by the reciprocating armature on the mounting frame. Flat springs mounted between the compressor and the mounting frame at both ends of the linear drive unit operate to isolate the compressor/counterbalance system relative to vibrations entering and leaving the system.

The isolator system can be damped by inserting an elastomeric material between the rim of the flat spring and the mounting frame to which it is attached. A damping ratio in excess of 0.1 is used to prevent transmission of vibrations into or out of the system, particularly within the operational frequency range of the dynamic absorber system.

The above, and other features of the invention including various novel details of construction and combination of parts, will now be more particularly described with reference to the accompanying drawings and pointed out in the claims. It will be understood that the particular linear drive system for the compressor of a cryogenic refrigerator embodying the invention is shown by way of illustration only and not as a limitation of the invention. The principle features of this invention may be employed in various embodiments without departing from the scope of the invention.

DETAILED DESCRIPTION OF THE INVENTION

Figure 1:
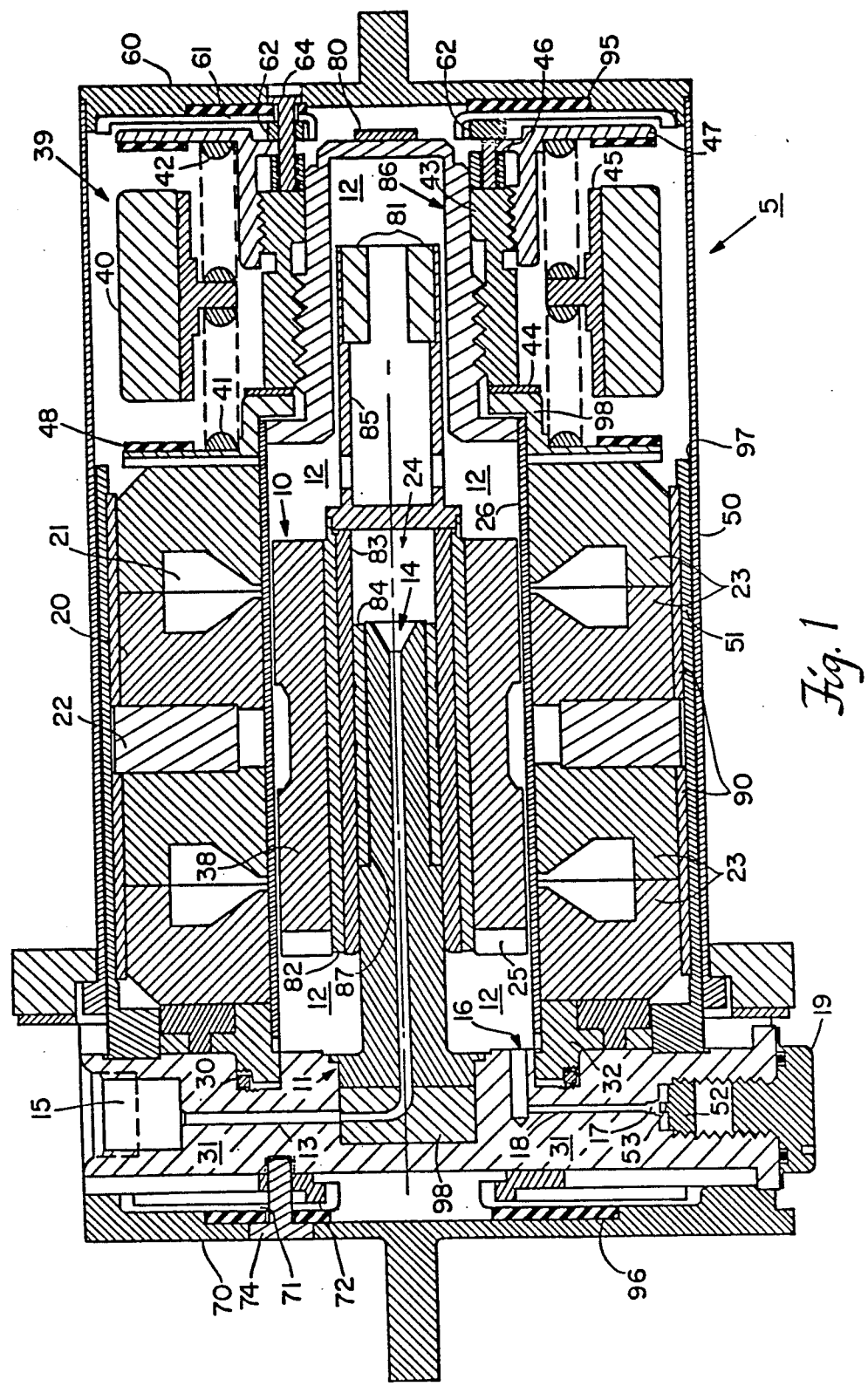
FIG. 1 is a cross-sectional view of a linear drive assembly of a helium cryogenic refrigerator of the present invention.
Figure 3:
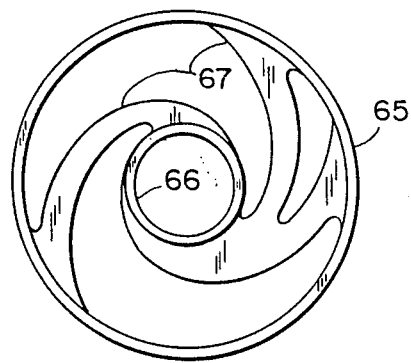
FIG. 3 illustrates a plan view of a flat spring isolator of the present invention.

A linear drive assembly of a helium cryogenic refrigerator utilizing a stationary piston of the present invention is illustrated in FIG. 1. A linear motor is used to control the movement of an armature 10 in the compressor 5. The linear motor utilizes an involute laminated stator 20 first disclosed in U.S. Pat. No. 4,761,960, of G. Higham et al. filed July 14, 1986 entitled "Cryogenic Refrigeration System Having an Involuted Laminated Stator for its Linear Drive Motor."

As shown in FIG. 1, this compressor 5 comprises a reciprocating armature 10 which compresses helium gas in a compression space 24. From the compression space 24 the gas passes through a port 14 in the stationary piston 11 to pre-formed bores through the piston 11 and plate 31 to form conduit 13. Conduit 13 runs along the core of stationary piston 11, then curves at a right angle in insert 98 to a gas fitting assembly 15. From the gas fitting assembly 15, gas is delivered to a cold finger of a cryogenic refrigerator such as a split stirling refrigerator in which a displacer is housed as disclosed in U.S. Pat. No. 4,545,209. The stationary piston 11, mounted at one end onto plate 31, is the sole support for armature 10.

Plate 31 provides a lead ball 53 and retainer screw 52 for sealing the port 17. The compressor is charged with helium gas through the port 17. The gas is allowed to communicate with a armature volume 12 through port 16 which is in communication with a second pre-formed conduit 18. During the compressor operation, however, the ball 53 is fixed against the plate 31 by the retainer screw 52. Screw 19 is provided to prevent dirt and debris from entering the ball 53 and screw 52 seal.

The armature 10 comprises an iron mass 38 fixed to a liner core 82. Iron is used because of its high magnetic permeability and high magnetic induction; however, other materials having the same characteristics may be used. A tungsten alloy ring or other high density non-magnetic material 25 may be incorporated at one end of the armature to give more mass to adjust the resonant frequency of operation and to help keep the armature's center of gravity within the confines of the clearance seal of the piston.

In order to detect the position of the armature a sensor 80 is used to detect a target magnet 81 fitted at one end of the armature 10. The magnet 81 is mounted on an extended cylinder 85 that oscillates within an extention 86 of the armature housing 26 during motor operation. This extension permits the utilization of an otherwise unused volume within a countermass system 39 concentrically disposed about the extension 86. By isolating the magnet 81 and sensor 80 away from the stator 20, the magnetic field of magnet 80 is decoupled from the magnetic field of the stator magnet 22.

Preferably, the armature 10 is fitted with a ceramic cylinder 83 to provide a clearance seal with the stationary piston. It is preferred that a sleeve 82 made of non-magnetic stainless steel or aluminum line the cylinder 83 to provide structural support to the ceramic cylinder. A cermet liner 84 is mounted on the piston 11 to form part of the clearance seal.

In a preferred embodiment, the stationary piston 11 is comprised of aluminum. The high thermal conductivity of aluminum permits the stationary piston to conduct heat away from the center of the drive unit through plate 31. Due to the large operating temperature range of the drive unit and the different coefficients of thermal expansion of aluminum and the materials in contact with the aluminum about the clearance seal, a compliant epoxy 87 is used to attach the cermet liner 84 to the piston 11. This permits the cermet piston junction to correct for any changes in temperature without causing a failure of the clearance seal or binding of the armature 10 with the piston 11. The piston 11 has a thick stem between the seal and the mount of the piston to prevent bending of the piston and uneven loading on the seal.

Surrounding the armature 10 just described is a pressure housing 26. The size of the pressure housing is constructed to allow helium gas in the armature volume 12 to flow freely between the pressure housing 26 and the iron mass 38 as the armature 10 shuttles back and forth.

Figure 2:
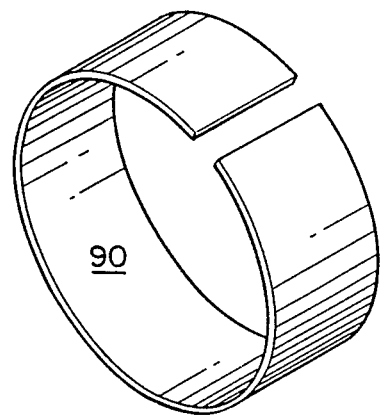
FIG. 2 illustrates a perspective view of a magnetic shield of the present invention.

A stator 20 is located around the perimeter of the pressure housing 26. The stator 20 comprises two coils 21 positioned between involuted laminations 23 and separated by a magnet 22. This static assembly is further described in U.S. Pat. No. 4,761,960, by G. Higham et al. recited above, which is incorporated herein. The splitting of the involute stator contributes to the amount of stray flux generated about the coils. Two shields 90 have been concentrically disposed about the involute lamination 23 to convey the magnetic flux lines along the inside wall 51 of the housing 50. FIG. 2 is a perspective view of one of the shields deployed about the coils. A preferred embodiment of the shields utilizes a magnetically oriented silicon iron material. This material is magnetically oriented in the axial direction to substantially confine the magnetic flux within the outer housing 50.

The shields contribute to the decoupling of the magnetic flux about the coil from the target magnet 81. The shields also substantially reduce magnetic noise from the motor from interfering with adjacent systems.

As a consequence of the armature 10 reciprocating back and forth, mechanical vibrations are produced by the compressor 5. To eliminate the vibrations, a passive vibration absorber or dynamic absorber 39 is attached to one end of the compressor and is tuned to resonate at the same frequency as the compressor's operating frequency. Preferably, the dynamic absorber 39 comprises a counterbalance mass 40 mounted with flange 45 between two springs 41 and 42 having small damping characteristics. As a result, the axial motion of the compressor is countered by the axial vibration from the counterbalance mass 40 of the absorber 39. A further description of dynamic absorber operation is found in U.S. Pat. No. 4,783,968, of G. Higham et al., filed Aug. 8, 1986, entitled "A Vibration Isolation System for a Linear Reciprocating Machine." The present system has bumpers 48 on the front 98 and rear 47 spring supports to absorb any impact of the absorber against the mounting frame of the compressor. The absorber system is mounted onto the housing extension 86 by ring nut 43. A spacer 44 is used to properly adjust the distance between the front 98 and rear 47 spring supports. The screw flange 46 is used to attach the flat spring 61 to the end of the compressor.

The present invention utilizes isolators mounted on opposite ends of the compressor. The two isolators have flat spiral springs 61 and 71 which are soft in the axial direction while being very stiff in the radial direction. FIG. 4 illustrates a plan view of a preferred embodiment of the flat spiral spring design. The outer diameter of the two springs 61 and 71 are attached to the housing end plates 60 and 70 respectively. The inner diameters are mounted onto flanges 64 and 72 and in turn attached to a screw flange 46 and housing plate 31, respectively, using bolts 62 and 74. The inner and outer diameter of the two springs are connected by a plurality of spiral arms. The springs are mounted on elastomeric material 95 and 96 located at both ends of compressor 5 providing a substantial level of damping to the isolator system. The damping ratio is defined as the dampening force divided by the spring force. A damping ratio in excess of 0.1, and preferably 0.2, is utilized to provide suitable attenuation of vibration at the resonant frequencies of the armature and absorber. Grease is applied to the outside surface of wall 51 to help remove heat from the stator 20 while providing damping of internal vibration of the compressor.

A soft metallic gasket 30 is configured between the plate 31 and flange 32 to seal the armature volume 12 of the linear drive unit from the external atmosphere. Copending application entitled "Helium Pressure Seal for a Cryogenic Refrigerator" corresponding to U.S. Pat. No. 4,842,287, filed on Oct. 22, 1987 by Allan Weeks describes the nature and operation of this seal in greater detail.

In contrast to the linear drive assembly of the patent application U.S. Pat. No. 4,783,968, referenced above, the central piston rather than the surrounding cylinder is stationary. A clearance seal is located along the outer surface of the piston cylinder 11 and along the inner surface of cylinder 83 of the armature 10. The stationary piston has the advantage of a microscopically rounded end at the edge of the clearance seal that first rubs against the armature 10 to minimize wear. This is facilitated by the ease of machining a rounded edge on the outer diameter of the stationary piston as opposed to the difficulty in machining the same rounded edge on the inner diameter of the cylinder in U.S. Pat. No. 4,783,968. The clearance seal of the stationary piston configuration also has a larger contact area to provide more uniform loading along the seal, thereby minimizing wear. The stationary piston also allows the center of gravity of the armature to always be located within the confines of the stationary piston volume. This eliminates moments acting on the armature which cause cross-bearing between the piston and the armature along the clearance seal. To minimize uneven wear along the wearing surface and increase the lifetime of system components.

The larger contact area and proper positioning of the center of gravity result from a relocation of the structural mass rquired to support the cylinder. For best results, the armature is of a mass dictated by the spring constant of the surrounding gas. In the prior system, that mass was obtained by filling the end of the armature which supported the piston. That shortened the piston for a given armature length and offset the armature center of gravity toward that end. With the stationary piston configuration, the structural mass behind the cylinder is now carried by the armature as cylinder 82. That mass, which is evenly distributed along the armature, obviates the need for the additional mass at the end and allows the piston to be extended further into the structure.

The present system is also reoriented relative to that of U.S. Pat. No. 4,783,968 in that the stationary piston extends toward the resonant mass assembly. As a result, the sensor target can be located in the space within the resonant mass assembly. The mass of the target is offset by the mass 25. Space was not available for such an offsetting mass in the prior system because of the shorter piston length discussed above.

We claim:
1. A cryogenic refrigerator having a compressor comprising a reciprocating armature which alternately compresses and expands to cool a portion of a working fluid to cryogenic temperatures, and a linear drive motor for driving the armature, the linear drive motor comprising;
   a housing for hermetically sealing the gaseous fluid in a volume;
   a coil assembly surrounding the housing;
   a stationary piston within the volume and attached to the housing at one end; and
   a permanent magnet armature which reciprocates within the volume, concentric about the stationary piston, and which forms a clearance seal along an outer surface of the piston.

2. The cryogenic refrigerator of claim 1 wherein the stationary piston is the sole mechanical support of the armature.

3. The cryogenic refrigerator of claim 1 further comprising an axial bore along the stationary piston for conveying the working fluid.

4. The cryogenic refrigerator of claim 1 wherein the stationary piston is comprised of aluminum such that the piston is used to conduct heat away from the volume.

5. The cryogenic refrigerator of claim 4 further comprising a liner attached to the outer surface of the stationary piston by a flexible material to form the clearance seal.

6. The cryogenic refrigerator of claim 1 wherein the coil assembly is concentric about the armature.

7. The cryogenic refrigerator of claim 1 wherein the driven armature freely reciprocates relative to the housing.

8. A linear drive motor for a cryogenic refrigerator comprising:
   a housing for hermetically sealing a gaseous fluid in a working volume;
   a stationary piston with an axial bore for conveying the fluid within the volume;
   a coil assembly surrounding the housing; and
   a permanent magnet armature having a center of gravity and having a linearly reciprocating motion within the volume, the armature being concentric about the stationary piston such that the center of gravity lies within the stationary piston throughout the reciprocating motion.

9. The linear drive motor of claim 8 wherein the armature forms a clearance seal with the stationary piston.

10. The linear drive motor of claim 8 wherein the driven armature freely reciprocates relative to the housing.

11. A linear drive motor for a cryogenic refrigerator with a position sensor comprising:
   a housing for hermetically sealing a gaseous fluid in a volume;
   a stationary piston within the volume and attached to the housing;
   a permanent magnet armature which reciprocates within the volume about the stationary piston;
   a coil assembly concentric about the armature;
   a nonmagnetic member attached to the armature and supporting a target magnet whose magnetic flux lines are substantially decoupled from magnetic flux lines about the coil; and
   a sensor for detecting the position of said target magnet relative to the housing.

12. The linear drive motor of claim 11 wherein the volume is comprised of an armature volume in which the armature reciprocates and a volume extension in which the target magnet reciprocates.

13. The linear drive motor of claim 12 wherein the housing is comprised of a cylinder surrounding the armature volume and a cylinder extension about the volume extension such that the target magnet does not enter the armature volume.

14. A shielded linear drive motor for a cryogenic refrigerator comprising:
   a housing for hermetically sealing a pressurized fluid in a volume;
   a permanent magnet armature which reciprocates within the volume to alternatively compress and expand a working fluid to cool a portion thereof;
   a coil assembly surrounding the housing and configured about the armature; and
   a shield configured about the coil for confining magnetic flux lines generated about the coil.

15. A shielded linear drive motor of claim 14 wherein said coil assembly is comprised of a split laminated stator.

16. A shielded drive motor of claim 14 further comprising a member, attached to the armature, and supporting a magnet whose magnetic flux lines are substantially decoupled from magnetic flux lines about the coil, and a sensor for detecting the position of said magnet with respect to the housing.

17. A cryogenic refrigerator having a compressor comprising a reciprocating armature which alternatively compresses and expands a gas in a working volume, a linear drive motor for driving the armature, and a vibration isolator system, wherein the vibration isolator system comprises:
   a mounting frame supporting the compressor;
   a counterbalance mass attached to the compressor such that an antiphase movement is produced relative to the reciprocating movement of the armature for substantially countering a resulting force exerted by the armature on the mounting frame; and
   an isolator mounted between the compressor and the frame comprising a flat spring with an outer rim affixed to the frame that is concentric about an inner rim affixed to the compressor, and a plurality of flexible arms extending from the outer rim to the inner rim.

18. The cryogenic refrigerator of claim 17 wherein the flexible arms spiral inward from the outer rim to the inner rim.

19. The cryogenic refrigerator of claim 17 wherein said isolator is comprised of a first flat spring mounted at one end of the linear drive unit along a linear axis of the unit and further comprising a second flat spring mounted at the opposite end of the linear drive unit along the linear axis.

20. The cryogenic refrigerator of claim 17 wherein said isolator further comprises an elastomeric material having a damping ratio of 0.1 or greater configured between the flat spring and the mounting frame.

21. The cryogenic refrigerator of claim 17 wherein the counterbalance mass is concentrically mounted about an armature extension supporting a magnet wherein said magnet is used to detect the position of the armature.

22. A linear drive motor comprising:
   a housing for sealing a working fluid in a volume;
   a stationary piston secured to the housing within the volume;
   a magnetic armature which reciprocates within the volume, concentric about the stationary piston, and which forms a clearance seal along an outer surface of the piston; and
   a coil assembly concentric with the armature to drive the armature.

23. The linear drive motor of claim 22 wherein the driven armature freely reciprocates relative to the housing.

24. The linear drive motor of claim 22 wherein the linear drive motor drives the working fluid of a compressor of a Stirling cycle refrigerator.

25. The linear drive motor of claim 24 further comprising a cold finger in fluid communication with a compression waves are generated in the wording fluid transmitted through the fluid to the cold finger.

26. The linear drive motor of claim 25 further comprising a conduit extending through the stationary piston to couple the compression space with the cold finger.

27. The linear drive motor of claim 22 wherein the linear drive motor drives the working fluid to and from a valveless compressor.

* * * * *

UNITED STATES PATENT AND TRADEMARK OFFICE
CERTIFICATE OF CORRECTION

PATENT NO. : 4,924,675

DATED : May 15, 1990

INVENTOR(S) : Graham J. Higham, Gerald R. Pruitt, Ronald Morris, Frank Heger, James Livingstone and David Tormey It is certified that error appears in the above-identified patent and that said Letters Patent is hereby corrected as shown below:

In Claim 25, Column 8, line 51 after "compression" the words ---space in the motor such that compression--- should be inserted.

Signed and Sealed this

Twelfth Day of May, 1992

Attest:

DOUGLAS B. COMER

*Attesting Officer*     Acting Commissioner of Patents and Trademarks